(12) United States Patent
Byrne

(10) Patent No.: US 11,849,338 B2
(45) Date of Patent: Dec. 19, 2023

(54) SYSTEMS AND METHODS FOR PROVIDING CELLULAR NETWORK ENHANCEMENTS

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 472 days.

(21) Appl. No.: 16/911,140

(22) Filed: Jun. 24, 2020

(65) Prior Publication Data
US 2021/0409972 A1 Dec. 30, 2021

(51) Int. Cl.
*H04W 24/02* (2009.01)
*H04W 36/04* (2009.01)
*H04W 36/32* (2009.01)
*G01S 5/14* (2006.01)
*H04W 4/029* (2018.01)
*H04W 64/00* (2009.01)
*G01S 5/00* (2006.01)

(52) U.S. Cl.
CPC ........... *H04W 24/02* (2013.01); *G01S 5/0027* (2013.01); *G01S 5/14* (2013.01); *H04W 4/029* (2018.02); *H04W 36/04* (2013.01); *H04W 36/32* (2013.01); *H04W 64/003* (2013.01); *G01S 2205/008* (2013.01)

(58) Field of Classification Search
CPC ..... H04W 24/02; H04W 4/029; H04W 36/04; H04W 36/32; H04W 64/003; H04W 16/22; H04W 64/00; H04W 36/22; G01S 5/0027; G01S 5/14; G01S 2205/008
See application file for complete search history.

(56) References Cited

U.S. PATENT DOCUMENTS

| | | | |
|---|---|---|---|
| 5,528,234 A | 6/1996 | Mani et al. | |
| 6,094,567 A * | 7/2000 | Berglund | H04W 24/04 455/424 |
| 7,834,754 B2 | 11/2010 | Kulesz et al. | |
| 10,529,221 B2 | 1/2020 | Jarrell et al. | |
| 2006/0187831 A1* | 8/2006 | Justen | G08B 25/009 370/229 |
| 2008/0219213 A1* | 9/2008 | Natarajan | H04W 28/0284 370/331 |
| 2009/0201218 A1* | 8/2009 | Li | H01Q 1/005 343/882 |
| 2017/0064531 A1* | 3/2017 | Stephenne | H04W 40/20 |
| 2017/0118629 A1* | 4/2017 | Syed | H04W 4/021 |
| 2019/0364480 A1* | 11/2019 | Mehran | H04W 16/28 |
| 2020/0137590 A1* | 4/2020 | Apostolos | H04W 36/08 |
| 2021/0302621 A1* | 9/2021 | Brown | G06F 3/14 |

* cited by examiner

*Primary Examiner* — Margaret G Mastrodonato
(74) *Attorney, Agent, or Firm* — Lee & Hayes, P.C.

(57) ABSTRACT

Systems, methods, and apparatuses for providing cellular network enhancements may utilize sensors mounted on or within a cellular base stations to collect information concerning environmental and/or shelter conditions. The collected information may be used by processing devices to predict a future load on a cellular network and may be used to optimize the number of channels needed for a particular base station. The collected information may also be transmitted to electronic devices in a cell coverage area to inform users of the electronic devices of the detected environmental and/or shelter conditions.

19 Claims, 12 Drawing Sheets

SYSTEMS AND METHODS FOR PROVIDING CELLULAR NETWORK ENHANCEMENTS

FIELD

Embodiments described herein generally relate to cellular networks and, in particular, to systems and methods for monitoring and enhancing operations of cellular networks in response to a present or future condition of a cellular network and/or a present or future condition of an environment or shelter surrounding and supporting the cellular network.

BACKGROUND

Cellular, or mobile, networks are a kind of communication network used to transmit wireless signals to a number of electronic devices. Cellular networks include a number of base stations, otherwise known as cell sites, that respectively provide wireless signals to a region surrounding each individual or set of base stations. Through the cellular network, a user of an electronic device may communicate with users of other linked electronic devices or electronic systems.

Each base station is able to transmit and receive a limited number or radio waves at any given time, due to frequency and hardware limitations. As such, base stations have a limited network load capacity which limits the number of calls or signals that can be transmitted or received at any given time. In order to make a call from an electronic device during a period of high network load, a user may have to wait until the network load subsides or may have to move to a nearby region serviced by a different base station.

SUMMARY

Embodiments described herein may relate to apparatuses, systems, and/or methods for providing a cellular network enhancement. A cellular network enhancement may be provided by collecting, with a sensor, information related to an environmental condition within a cell coverage area of a base station. It may be determined, from the collected information, that the environmental condition will inflict a threshold strain on a cellular network that transmits through the base station. In response to a determination that the environmental condition will inflict the threshold strain, signals of the cellular network may be routed to an alternate base station.

In some embodiments, the sensor may comprise a camera, the collected information may comprise at least one image captured by the camera, and the environmental condition may comprise a density of electronic devices within the cell coverage area. The method for providing a cellular network enhancement may further comprise analyzing the image to determine a first number of people present in the image, estimating, from the first number of people present in the image, a second number of people not present in the image and within the cell coverage area, estimating how many of the first number of people and the second number of people are using electronic devices, determining an estimated density of the electronic devices within the cell coverage area, and predicting a load that the electronic devices will place on the cellular network.

In some embodiments, the sensor may be a collection of weather sensors. The collected information may be at least one of a pressure value, a temperature value, a humidity value, or a wind speed value. The environmental condition may correspond to a future weather condition comprising at least one of frost, snow, lightning, rain, or hail and may be predicted to damage the base station.

In some embodiments, an alert containing the future weather condition may be sent to electronic devices connected to the cellular network and within the cell coverage area. Additionally or alternatively, a maintenance service may be sent an alert containing the future weather condition and predicted damage to the base station.

In some embodiments, the cellular network may include an overloaded portion and a mobile switching center may transfer signals of the overloaded portion from the base station to the alternate base station.

In some embodiments, the base station may be part of a grid and may comprise a set of base stations connected to the cellular network. Each base station of the set of base stations may comprise a set of sensors and a mobile switching center may be configured to route the signals of the cellular network between the set of base stations based on readings from the set of sensors.

In some embodiments, the environmental condition may be at least one of a current weather condition, a future weather condition, a natural disaster, an automobile density, a human population density, or a manmade disaster.

A cellular base station-mounted system for collecting and aggregating information may include a first set of sensors mounted on a base station and configured to collect shelter information related to a shelter condition for components for the base station and a second set of sensors mounted on the base station and configured to collect environmental information related to an environmental condition within a cell coverage area of the base station. Additionally, a processor may be provided to determine that at least one of the collected shelter information or the collected environmental information is inflicting or will inflict a threshold strain on a cellular network that transmits through the base station and to route signals of the cellular network to an alternate base station.

In some embodiments, the second set of sensors may collect density information and the processor may estimate a number of electronic devices connected to the cellular network within the cell coverage area.

The second set of sensors may be a set of cameras configured to capture image information regarding a number of vehicles within the cell coverage area and the processor may estimate a load on the cellular network based on the number of vehicles.

The second set of sensors may be a set of infrared cameras configured to capture image information regarding a number of people within the cell coverage area and the processor may estimate a load on the cellular network based on the number of people.

The environmental condition may be at least one of a current weather condition, a future weather condition, a natural disaster, an automobile density, a human population density, or a manmade disaster.

In some embodiments, at least one of the shelter information or the environmental information may be transmitted to an electronic device connected to the cellular network.

A method for providing a cellular network enhancement may include collecting information, from a sensor, within a cell coverage care of a base station, the base station transmitting signals of a cellular network. The method may further include predicting a future event occurring within the cell coverage area will disrupt the cellular network at a future time and transferring the signals of the cellular network to an alternate base station at the future time.

In some embodiments, the cell coverage area may be monitored by a sensor configured to detect a weather condition and the weather condition may be predicted to cause damage to the base station at the future time.

In some embodiments, an alert containing information about the weather condition may be transmitted to electronic devices present within cell coverage area.

In some embodiments, an alert containing information about the weather condition and the predicted damage to the base station may be transmitted to a maintenance service before the future time.

In some embodiments, a mobile switching center may transfer signals to the alternate base station to reduce a network load on the cellular network. A channel of the alternate base station may be controlled by the base station at the future time.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims. Identical reference numerals have been used, where possible, to designate identical features that are common to the figures.

Figure 1:
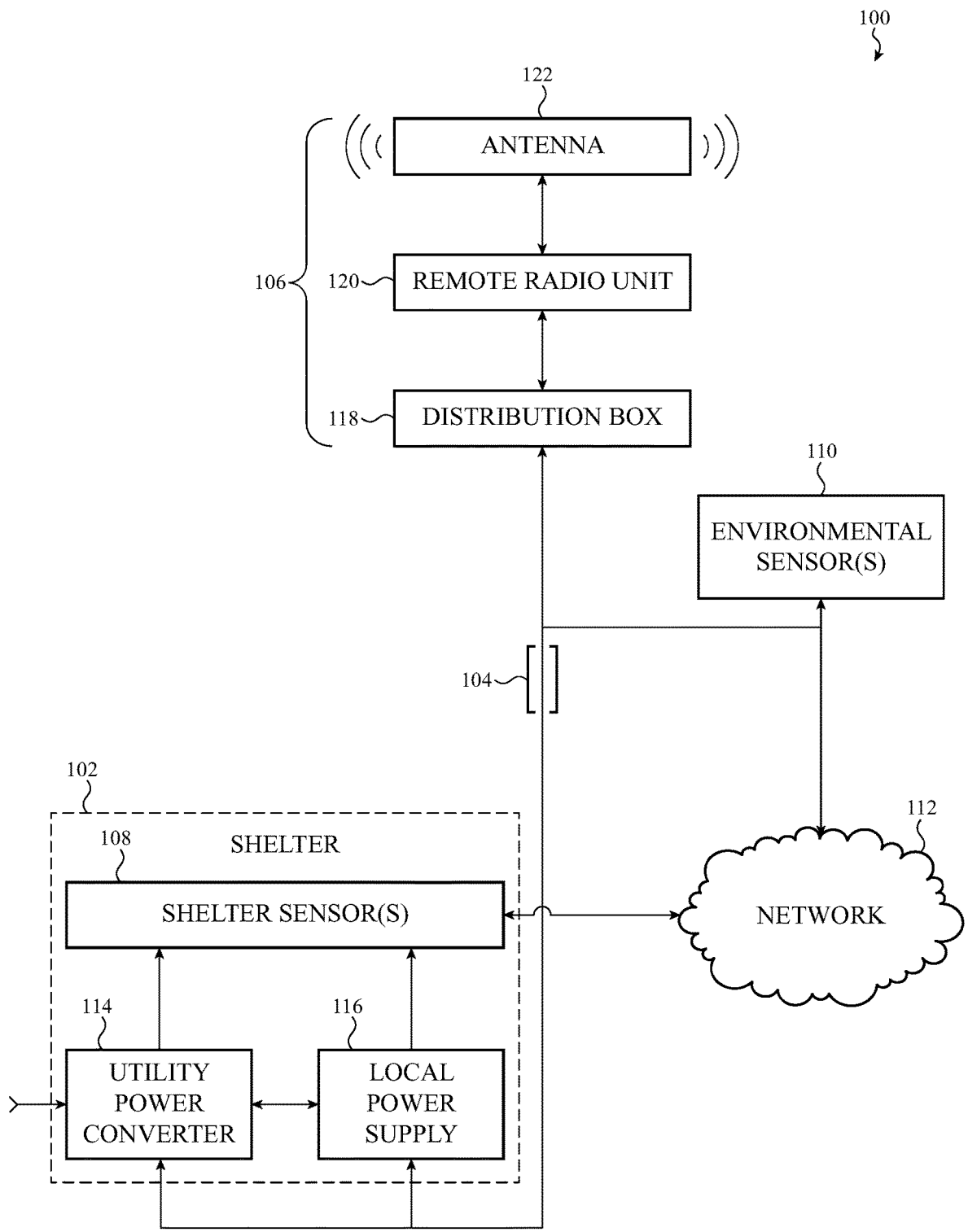
FIG. 1 depicts an example block diagram of a cellular base station, associated networks, and components that may be used to perform systems, methods, and processes for collecting and aggregating information related to environmental and shelter conditions, as described herein.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to systems, methods, and processes for detecting environmental and/or shelter conditions from a base station and within a cell coverage area of base station. In particular, embodiments described herein are directed to performing and providing cellular network enhancements (e.g., improvements to a cellular network) based on information relating to the environmental and/or shelter conditions.

It should be understood that the technical solutions as discussed herein may include or be implemented with respect to a number of various cellular technologies, including Global System for Mobile Communications (GSM); General Packet Radio Service (GPRS); CDMA2000; cdma-One; Evolution-Data Optimized (EV-DO); Digital Enhanced Cordless Telecommunications (DECT); Digital AMPS (IS-136/TDMA); Integrated Digital Enhanced Network (iDEN); Long-Term Evolution (LTE); Worldwide Interoperability for Microwave Access (WiMAX); 4G technologies; 5G technologies; Advanced Mobile Phone System (AMPS); and the like. Any kind of cellular technology may be used in accordance with the disclosed system and cellular network enhancements may be provided, in whole or in part, to one or a number of these cellular technologies.

As used herein, a "base station" may refer to a cellular-enabled site where antennae and cabinet equipment (e.g., hardware) is placed on a structure such as a tower. Example hardware may be referred to as a Node B in 3G CDMA networks and as an eNodeB (eNB) in LTE/4G networks. In some embodiments, the installed hardware may be controlled by an external controller (e.g., a Radio Network Controller (RNC)). In some embodiments, the installed hardware may include an integrated controller to perform on-site logic operations. Base stations may also include equipment for providing bandwidth for Internet access and data use.

A cellular network may include a number of discrete base stations, where each base station provides radio signals to an area surrounding the respective base station. These areas may be referred to as a "cell coverage area." Each base station may be registered to one or more cell coverage areas and may transmit and receive all or a portion of the radio signals corresponding to the cellular network within the cell coverage area. In some embodiments, cell coverage areas serviced by base stations may overlap to ease a transition as a user of the cellular network moves between cell coverage areas. In some embodiments, multiple base stations may be provided in a cell coverage area to account for buildings, vegetation, terrain, network load, and the like. As used herein, a cell coverage area may be used to refer to an entire area surrounding a base station where cell signals reach or may be used to refer to a subset thereof.

Base stations may have capacity for a limited number of calls at any given time. For example, a base station may have 168 voice channels available, although in other embodiments base stations may have more or fewer available voice channels. If the number of voice channels implemented within the base station is insufficient to handle call load at a particular time, the calls may be dropped or may otherwise fail to connect with the cellular network. Other networks that transmit through a base station, such as a data network or the Internet, may also have a limited capacity and may suffer from high network load.

According to embodiments of the present disclosure, sensors may be provided on a base station to collect information on environmental and/or shelter conditions. As used herein, "environmental information" may refer to information relating to an environmental condition, which may refer to information about the natural world within or nearby a cell coverage area. For example, an environmental condition may be a current weather event (e.g., a snowstorm, a hailstorm, a rainstorm, high-temperature, low-temperature, and the like); a future weather event (e.g., a snow storm occurring in 4 hours, a weather forecast, and the like); a humidity level; a natural disaster (e.g., an earthquake, a tsunami, a tornado, and the like); a traffic condition (e.g., foot- or car-traffic); a human population density (e.g., the number of people within the region surrounding the base station); a future human population density (e.g., a predicted density level in one hour); and the like. An environmental condition may be any external event that occurs or will occur in a cell coverage area of base station.

As used herein, "shelter information" may refer to any collected information related to a shelter condition affecting equipment or structures of the base station and/or associated structures. For example, a shelter condition may be a fire within base station equipment; extreme cold or hot temperatures in a localized area (e.g., a computer system overheating); ice conditions (e.g., ice present on the base station framework); an unauthorized person (e.g., an attempted thief); and/or any other event that may affect base station equipment and/or structures. In some embodiments, an environmental condition may affect base station equipment and/or structures and may be considered a shelter condition (e.g., a condition affecting the shelter/base station). As used herein, "shelter" and "base station" may be used interchangeably and may each refer to a cellular base station and associated structures.

As used herein, a condition (e.g., an environmental or shelter condition) refers to a real-world property or occurrence (e.g., a temperature, a population density, a weather event, and the like) and information (or data) refers to a collected representation of the real-world condition (e.g., a picture/video, a soundwave, a temperature reading in degrees, a mathematical formula or representation, and the like).

A number of sensors may be provided within and/or outside a base station to monitor and/or collect information related to environmental or shelter conditions. In some embodiments, environmental sensors may be affixed to an external structure of a base station (e.g., a tower) and may be positioned at a high altitude to best detect environmental conditions. In some embodiments, the environmental sensors may be positioned at a central location (e.g., at a city's weather center or a centralized base station within a network of such stations) and information relating to environmental conditions may be transmitted to a number of different base stations. Environmental sensors may include weather/atmospheric sensors; natural disaster sensors, such as seismographs, wind-speed sensors, and the like; cameras or optical sensors; microphones or audio sensors; network load detectors; and the like.

In some embodiments, shelter sensors may be affixed inside buildings associated with, or corresponding to, a base station. Shelter sensors may additionally or alternatively be positioned at any position on or near a base station. In some embodiments, shelter sensors may be configured to obtain information relating to a shelter condition that requires maintenance procedures. Shelter sensors may obtain information relating to a shelter condition, either current or future, where maintenance is desired. Example shelter sensors may include smoke/fire detectors; cameras or optical sensors; a security system; equipment monitoring systems; and the like. Example shelter conditions include fires; overheating equipment; structural integrity; the presence of rain, snow, or ice; and the like.

According to embodiments of the present disclosure, information related to environmental and/or shelter conditions may be used to initiate network enhancements. The information may be obtained from any type of sensor, may be of environmental and/or shelter conditions and may be in the form of, for example: image/picture data; sound/wavelength data; temperature data; electromagnetic data; humidity data; wind speed data; pressure data; any combination thereof; and the like.

In some embodiments, sensors and associated systems may predict that an increased network load will likely occur (e.g., an increased network load may be considered more likely than not by processing systems) and network signals may be pre-emptively adjusted and routed before the increased network load is predicted to occur.

For example, an environmental condition may be a human and/or automobile density in a cell coverage area of a base station. Installed sensors may collect information relating to the population density and may determine the number of humans and/or automobiles in the area. For example, cameras and/or optical sensors (e.g., infrared detectors) may capture image information (e.g., picture or video) and image processing analyses may count or estimate the number of people or automobiles in the captured images. The number of people counted or estimated may correspond to a number of people in the entire cell coverage area serviced by the base station or may be partial information used as an extrapolation tool to estimate a number of people in the cell coverage area.

Continuing this example, after the number of people in the cell coverage area are counted or estimated, systems controlling network operations may predict a future network load. For example, if 100 people are detected or estimated by image recognition analyses, systems may determine that a peak of 30 simultaneous calls are normally expected. If the base station has a capacity well in advance of 30 voice channels, the base station may loan channels to nearby base stations. Similarly, if 500 people are detected or estimated, systems may determine that a peak of 150 simultaneous calls are expected. If more voice channels would be needed to meet that demand, the base station may borrow channels from nearby base stations. The provided numbers are merely explanatory and any ratio of people-to-expected simultaneous calls may be used in accordance with the present disclosure.

In addition to using information relating to a density condition, event information may also be used to predict network load. For example, a popular sporting event occurring in the area (e.g., a professional football game) may be determined, by previously gathered statistical data, to correspond to a higher percentage of network utilization. For example, a user network utilization may ordinarily be 30%, but may be 60% if a sporting event is ongoing. In some embodiments, upcoming events may be stored (e.g., in a virtual calendar), network load may be predicted, and channel switching may be done in advance of the event occurring or before certain activities associated with the event occur (e.g., halftime at a football game, an intermission at a live performance, the end of a show, and so on). The provided numbers are merely explanatory and any expected user network utilization may be used in accordance with the present disclosure.

In some embodiments, collected information may be used to determine or predict shelter conditions of the base station. For example, smoke or fire detectors may be used to determine that a fire is on the premise of the base station. In response to a determination that a fire exists, all channels currently in use by the base station may be temporarily closed and network signals that would ordinarily route through the base station may be routed through nearby base stations to continue network operations for the on-fire base station. In alternate or additional embodiments, collected information may determine that an extreme weather condition or natural disaster will occur within a certain number of days. In response to the predicted extreme weather condition or natural disaster, channels of the base station may be scheduled to be closed on the date the extreme weather condition or natural disaster is to occur (e.g., in order to entice people to evacuate the area and/or to protect sensitive electronic equipment). In addition, maintenance crews may be alerted that the affected base station will be closed on a particular day and may begin preparing preventative measures (e.g., boarding up doors/windows on the base station, reinforcing equipment, moving equipment, and so on).

The above examples are merely explanatory and are not limiting. In alternative embodiments, an extreme weather condition or natural disaster may result in opening additional channels of the base station or in borrowing channels from nearby base stations.

In some embodiments, collected information may be used to alert a maintenance crew of a problem with the base station. For example, in cold weather conditions, ice may form in electronically- or structurally-sensitive areas. If cold weather, or ice, is detected from collected information (e.g., image or weather information), maintenance crews may be automatically alerted to remove the ice. The above is merely an example. Other shelter conditions, other than the presence of ice, may be detected by the sensors.

In some embodiments, collected information may be provided to users of the cellular network. For example, a camera may collect information related to an environmental condition such as, for example, cars on a highway. The collected information from the camera may be analyzed to determine a current or future traffic condition. This information (e.g., raw data or analyzed data) may then be transmitted to a user of the cellular network (e.g., a user of the cellular network within the cell coverage area) so as to assist the user in navigating traffic conditions. In some embodiments, this collected information may be provided automatically to all users within the cell coverage area. In some embodiments, this information may be provided to users that purchase a subscription plan or are otherwise enrolled in a data management system containing the data.

In some embodiments, any information collected by sensors such as described herein may be stored in external servers and may be accessible by a computer network (e.g., the Internet). In such embodiments, any electronic device capable of connecting to the computer network may access the collected information by, for example, a subscription plan or one-time fee.

These foregoing and other embodiments are discussed below with reference to FIGS. 1-10. However, those skilled in the art will readily appreciate that the detailed description given herein with respect to these figures is for explanation only and should not be construed as limiting.

FIG. 1 depicts an example block diagram of a system 100 containing a cellular base station, an associated network 112, and associated components. The system 100 may include a shelter 102, the network 112, a power supply line 104, and cellular network transmission components 106. Environmental sensor(s) 110 may additionally be provided within the system 100. In some embodiments, the environmental sensor(s) 110 may be provided on a tower of the cellular base station.

The shelter 102 may include shelter sensor(s) 108, a utility power converter 114, and a local power supply 116. The shelter sensors 108 may include one or a number of sensors configured to collect information on, and monitor, an shelter conditions. For example, shelter sensor(s) 108 may be configured to detect shelter conditions such as: a temperature inside the shelter; operating conditions of the shelter equipment; fire detection; and the like.

In some embodiments, the shelter 102 may include various structural elements such as a supporting structure, a tower, a mast, and/or a building. The shelter 102 may be built from one or a number of materials, including metal, wood, plastic, brick, stone, and the like. In some embodiments, the shelter 102 includes a structure designed to house electronic components and/or to house network engineers, a metallic tower designed to support antennas, and/or wiring designed to link electronic components.

As discussed herein, the shelter sensor(s) 108 may be any sensors configured to monitor conditions within or surrounding the shelter 102. The shelter sensor(s) 108 may be communicatively linked with each other, by wireless or wired mechanisms, and/or to an alert system configured to inform a maintenance crew of a condition of the shelter 102. In some embodiments, a maintenance crew may log into a remote terminal (e.g., a home or workplace computer) to see the status of equipment within or surrounding the shelter 102 (e.g., the utility power converter 114, the local power supply 116, and/or the cellular network transmission components 106). The shelter sensor(s) 108 may also be configured to collect information related to shelter conditions.

In one example, the shelter sensor(s) 108 may detect the presence of unauthorized persons surrounding, or in, the shelter 102. If unauthorized persons are detected, the shelter sensor(s) 108 may detect the unauthorized access, may lock or shut down certain equipment, may alert a maintenance crew, and/or may alert law enforcement. The shelter sensor(s) 108 may further include temperature detectors to detect a temperature of the shelter 102 or equipment housed within or near the shelter 102, as well as whether such temperatures are outside of a normal operating range.

The utility power converter 114 may include circuitry for converting alternating current received from a commercial utility into direct current. The utility power converter 114 may then provide direct current power to components of the system 100, such as to the shelter sensor(s) 108, along the power supply line 104, to the cellular network transmission components 106, and to the environmental sensor(s) 110. In some embodiments, the utility power converter 114 may be monitored by at least one of the shelter sensor(s) 108 which may periodically or continuously detect, for example: status information; power consumption information; power use information; power outage information; voltage and current information; and the like. The utility power converter 114 may include one or more rectifiers, switch-mode power supplies, or other voltage converters. The utility power converter 114 may be configured in any suitable manner to convert power received from a utility into power usable by others systems or subsystems housed in or around the shelter 102, including the cellular network transmission components 106.

The local power supply 116 may be used as a backup power supply to provide power to components of the system 100 when power output from the utility power converter 114 fails or otherwise falls below a predetermined threshold. In some embodiments, the local power supply 116 may operate in conjunction with the utility power converter 114 and/or may provide power to selected components (e.g., the shelter sensor(s) 108 and the environmental sensor(s) 110). The local power supply 116 may include a combustion generator, one or a number of batteries, solar panel arrays, a flywheel generator, and the like. Many alternative configurations for the local power supply 116 are considered. In some embodiments, the local power supply 116 may be initiated once the shelter sensor(s) 108 detect operating problems with the utility power converter 114.

The power supply line 104 may be used to transmit power (e.g., power from the utility power converter 114 and the local power supply 116) to systems of the base station (e.g., to the cellular network transmission components 106). The power supply line 104 may be composed of any material used to transmit power. Operations of the utility power converter 114 and the local power supply 116 may be designed to offset a power loss as power transmits through the power supply line 104.

The cellular network transmission components 106 may be hardware and software designed to transmit and receive radio signals. In some embodiments, the cellular network transmission components 106 may include eNodeB elements for a LTE Radio Access Network. In alternative or additional embodiments, other network hardware/software elements may be used. The cellular network transmission components 106 may include a distribution box 118, a remote radio unit 120, and an antenna 122.

The distribution box 118 may take the form of electronic hardware and software configured to distribute signals and/or power to one or more components mounted at the top of the depicted structure. The distribution box 118 may be equipped to prevent high voltages from reaching the remote radio unit 120 and/or the antenna 122 and may, in some embodiments, automatically prevent power from reaching those components in a power surge. In some embodiments, the distribution box 118 may shut-down power if sensors (e.g., the shelter sensor(s) 108 and the environmental sensor(s) 110) detect a natural disaster and/or a manmade disaster.

The remote radio unit 120 may transmit and receive radio signals. The remote radio unit 120 may include a number of channels and each channel may be configured to transmit signals related to, for example, a single phone call. Any number of channels (e.g., 168 channels) may be provided in the remote radio unit 120. As discussed herein, the channels may occasionally be entirely filled during peak periods. As such, the remote radio unit 120 may be connected to the network 112 and may borrow channels from remote radio units of alternate base stations. Likewise, if alternate base stations are experiencing heavy load, the remote radio unit 120 may lend its channels to the alternate base stations. In addition to voice channels configured to route cellular phone calls, additional channels may be provided to allow a user to access an additional network (e.g., the Internet).

The antenna 122 may comprise one or more antennas and may send and receive radio signals within a region surrounding the base station.

As discussed herein, the environmental sensor(s) 110 may be any sensor, or collection of sensors, configured to monitor conditions in a cell coverage area surrounding the shelter 102. The environmental sensor(s) 110 may be communicatively linked by wireless and/or wired mechanisms and may be linked with an alert system configured to inform a maintenance crew of an environmental condition. In some embodiments, the environmental sensor(s) 110 may be linked to the network 112 and may receive weather forecast information. The environmental sensor(s) 110 may include temperature sensors, humidity sensors, cameras and optical sensors, natural disaster sensors, barometric pressure sensors, and the like. The environmental sensor(s) 110 may be used to measure or predict a population density in a cell coverage area and/or may be used to measure or predict weather events, as non-limiting examples. In one example, the environmental sensor(s) 110 may detect a snowstorm, or other weather event, that is about to impact the base station. In such an event, the environmental sensor(s) 110 may inform and transmit information concerning the upcoming snowstorm, or other weather event, via the network 112 and/or to components of the system 100.

In some embodiments, the environmental sensor(s) 110 may be communicatively coupled with the environmental sensor(s) in other base stations. In this way, a grid of environmental sensors may be used to detect environmental conditions over a wide area. In some embodiments, the movement of environmental conditions (e.g., rainstorms or snowstorms) may be tracked across a number of base stations.

The shelter sensor(s) 108 and/or the environmental sensor(s) 110 may be communicatively coupled to a network 112 (e.g., the Internet, a private network, or the like). The shelter sensor(s) 108 and the environmental sensor(s) 110 may be provided with networking equipment to upload collected information to an external server. In some embodiments the shelter sensor(s) 108 and the environmental sensor(s) 110 may be provided with computer components and may download information, such as a weather forecast, from the external server. The downloaded information may be used to affect an operation of the sensors and/or to affect an operation of the system 100.

Figure 2:
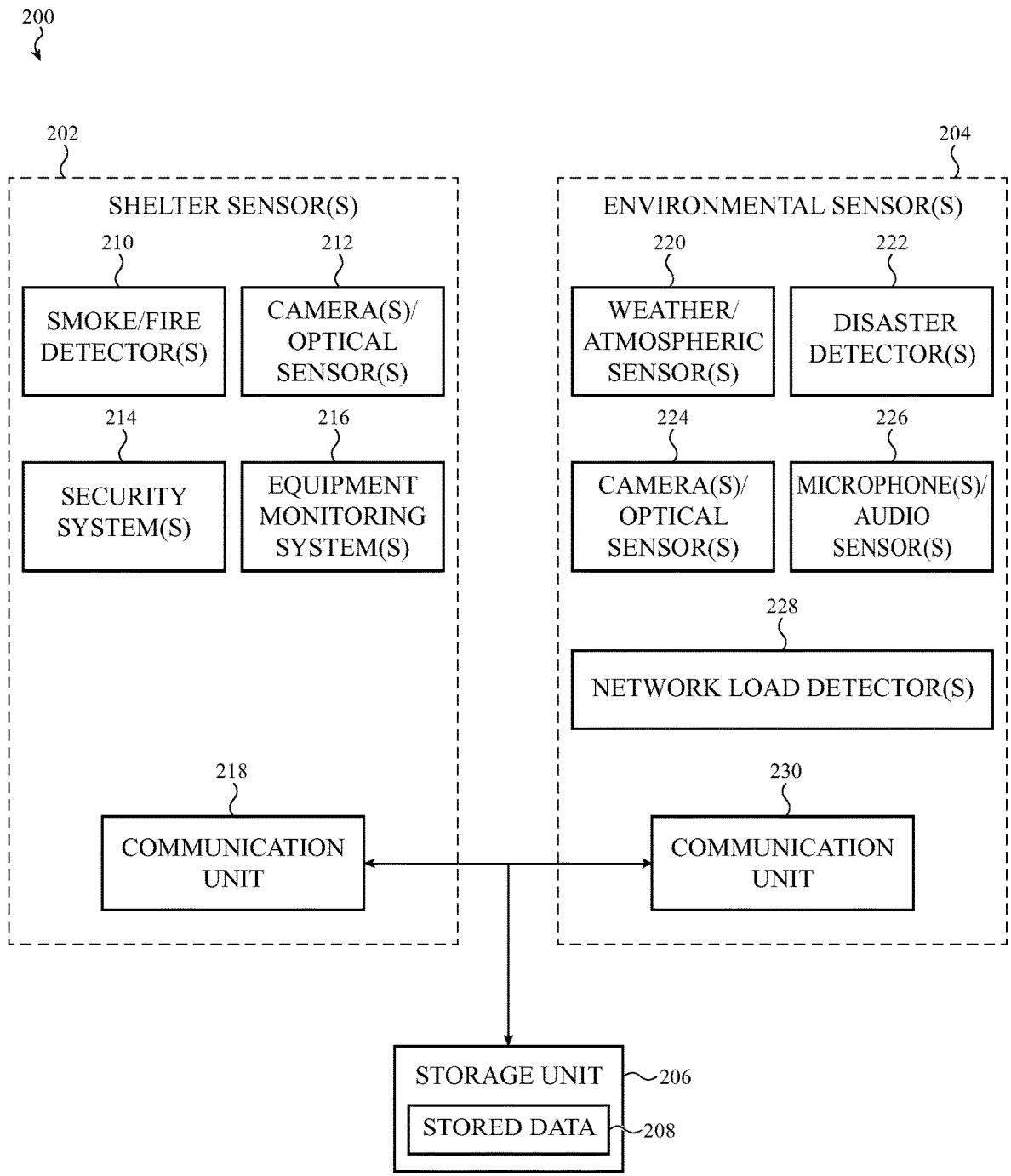
FIG. 2 depicts an example block diagram of example sensor suite and associated components, as described herein.

It may be appreciated that the foregoing description of FIG. 1 and the various alternatives thereof are presented for the purposes of explanation and to facilitate a thorough understanding of various possible configurations of a base station. However, it will be apparent to one or ordinary skill in the art that some of the specific details presented herein may not be required in order to practice a particular described embodiment. In addition, it will be apparent that many modifications and variations are possible in view of the above teaching FIG. 2 depicts a sensor suite 200, including shelter sensor(s) 202, environmental sensor(s) 204, and a storage unit 206 configured to store information (e.g., stored data 208) collected by the shelter sensor(s) 202 and the environmental sensor(s) 204. As noted with respect to FIG. 1, the provided sensors may be provided at any location near, on, or within the shelter 102. In some embodiments, the sensors may be provided near the top of a tower to better collect information related to environmental conditions. In alternative or additional embodiments, sensors may be positioned within a shelter to collect information related to shelter conditions.

The shelter sensor(s) 202, as described with respect to FIG. 1, may be configured to detect shelter conditions of a base station and/or equipment present near, on, or within the base station. The shelter sensor(s) 202 depicted in FIG. 2 are merely examples and any sensor used to monitor a shelter condition may be used in additional or alternative embodiments.

The shelter sensor(s) 202 may include smoke/fire detector(s) 210; camera(s) or optical sensor(s) 212; security system(s) 214; equipment monitoring system(s) 216; and a communication unit 218. The communication unit 218 may send and receive signals to connect the shelter sensor(s) 202 with the environmental sensor(s) 230, the storage unit 206, and/or a network (e.g., the Internet). The communication unit 218 may include hardware and software for sending and receiving information and may use Wi-Fi, BLUETOOTH, near field communication (NFC), and/or other wireless communication techniques. In some embodiments, the communication unit 218 may comprise wires that physically links electronic systems. The communication unit 230 may operate in a substantially similar matter with respect to the environmental sensor(s) 204.

The smoke/fire detector(s) 210 may be configured to detect the presence of smoke or fire in or around the base station. The smoke/fire detector(s) 210 may comprise a temperature sensor; a photoelectric sensor; an ionization detector; any other smoke or fire detector; or any combination thereof. In some embodiments, the smoke/fire detector(s) 210 may be communicatively coupled with a sprinkler system which may dispense water and/or fire retardant to extinguish a fire. The smoke/fire detector(s) 210 may be communicatively coupled with other electrical components in the base station (e.g., the utility power converter 114 depicted in FIG. 1) and may direct the other electrical components to shut down if smoke and/or fire is detected. In this way, dangerous electrical conditions arising from damaged equipment may be reduced or even minimized. In some embodiments, the smoke/fire detector(s) 210 may send an alert signal to a maintenance team and/or a fire department which may alert them of a fire. In this way, an automatic fire and alert detection system may be provided.

The camera(s) or other optical sensor(s) 212 may be configured to capture image information inside the base station. The camera(s) or optical sensor(s) 212 may be one or a number of cameras or optical sensors and may be configured to detect light in the visible, infrared, and/or ultraviolet spectrums. For example, the camera(s) or optical sensor(s) 212 may be infrared sensors and may be directed toward electrical equipment to detect an operating temperature of the electrical equipment. If any piece of electrical equipment is running at excessive temperatures, systems communicatively connected to the cameras or optical sensors may alert a maintenance crew and/or may automatically turn off the electrical equipment. In some embodiments, the camera(s) or optical sensor(s) 212 may be a high-definition camera and may act as a security camera. The image information taken by the security camera may be stored as stored data 208 within the storage unit 206.

The security system(s) 214 may be configured to detect the presence of an intruder, such as a person or an animal. In some embodiments, the security system(s) 214 may include sensors configured to detect whether a door or window is being opened or is open, motion detectors, and the like. The security system(s) 214 may initiate an alert if an unauthorized presence is detected. If an authorized user wishes to enter the base station, a password-protected device may be provided. If the correct password is provided to the password-protected device, the security system(s) 214 may transition to a stand-by mode and may temporarily stop or reduce security monitoring.

The equipment monitoring system(s) 216 may include circuitry and/or sensors designed to detect the health of equipment within or surrounding the base station (e.g., the utility power converter 114 and/or the cellular network transmission components 106, as described with respect to FIG. 1). The equipment monitoring system(s) 216 may be any system designed to ensure that electrical equipment is in normal operating ranges. In some embodiments, the equipment monitoring system(s) 216 may include software designed to ensure a computer program is running correctly. In some embodiments, the equipment monitoring system(s) 216 may detect the presence of ice on structures of the base station and may alert a maintenance crew to remove the ice. In various embodiments, if the equipment monitoring system(s) 216 detect an issue with any base station equipment, the equipment may be automatically shut down until a repair is performed.

In some embodiments, any information collected by the shelter sensor(s) 202 may be uploaded to an external server and may be accessible via an online network (e.g., the Internet). Additional or alternatively, the collected information may be stored as stored data 208 within the storage unit 206. The storage unit 206 may be located near the base station or may be located in a location remote from the base station. In some embodiments, the collected information may be available via the cellular network and may be accessible via electronic devices connected to the cellular network. In some embodiments, the collected information may be available by, for example, a subscription service.

The environmental sensor(s) 204 may include any sensor configured to monitor environmental conditions (either present or predicted) in a cell coverage area. The environmental sensor(s) 204 may include weather and atmospheric sensor(s) 220, disaster detector(s) 222, camera(s) or optical sensor(s) 224, microphone(s) or audio sensor(s) 226, and network load detector(s) 228. As discussed above, a communication unit 230 may be configured to send or receive collected signals.

The weather and atmospheric sensor(s) 220 may include barometric sensors, temperature sensors, humidity sensors, and any other sensors configured to detect weather conditions (either current or forecast). For example, the weather and atmospheric sensor(s) 220 may be configured to determine where it is currently raining and/or a future time when it will rain. The weather and atmospheric sensor(s) 220 may additionally be configured to obtain forecast information from a network in addition to collected data.

The disaster detector(s) 222 may be configured to detect any natural disaster (e.g., earthquakes, tsunamis, tornados, floods, and the like) and/or any manmade disaster (e.g., riots, gunshots, and bomb blasts). The disaster detector(s) 222 may include seismographs, microphones, cameras, barometric pressure detectors, and the like. The disaster detector(s) 222 may predict a disaster and may produce an alert warning of the impending or presently occurring natural disaster or manmade disaster. In some embodiments, the disaster detector(s) 222 may automatically send a warning to electronic devices connected to the cellular network, or to a subset of electronic devices connected to the cellular network within a particular geographic area, warning of the impending or occurring disaster.

The camera(s) or optical sensor(s) 224 may be configured to capture image information in a cell coverage area. The camera(s) or optical sensor(s) 212 may be one or a number of cameras or optical sensors and may be configured to detect light in the visible, infrared, and/or ultraviolet spectrums. For example, the camera(s) or optical sensor(s) 224 may be configured to detect population density information, including image information of people or automobiles. In some embodiments, the camera(s) or optical sensor(s) 224 may be a high-definition camera. In some embodiments, the camera(s) or optical sensor(s) 224 may be an infrared detector configured to detect body heat. Image information captured form the camera(s) or optical sensor(s) 224 may be stored as stored data 208 in the storage unit 206 and may be analyzed by computer systems using, for example, image analysis techniques.

The network load detector(s) 228 may be electronic equipment configured to determine the stress that a cellular network is under. In some embodiments, the network load detector(s) 228 may determine how many voice channels are currently in use. The network load detector(s) 228 may additionally be configured to borrow voice channels from nearby base stations in the event that all, or nearly all, local voice channels are in use. In some embodiments, the network load detector(s) 228 may lend unused channels to nearby cellular networks if the nearby cellular networks are experiencing heavy load. In some embodiments, the network load detector(s) 228 may detect voltage or current information within the cellular network transmission components 106 and/or other electrical components of system 100 (see FIG. 1) and may detect an electrical overload.

The sensors and detectors mentioned above are merely explanatory and are not intended to limit the kind of sensors provided in accordance with this disclosure. Other sensors and detectors may be provided as would be commonly understood.

Figure 3:
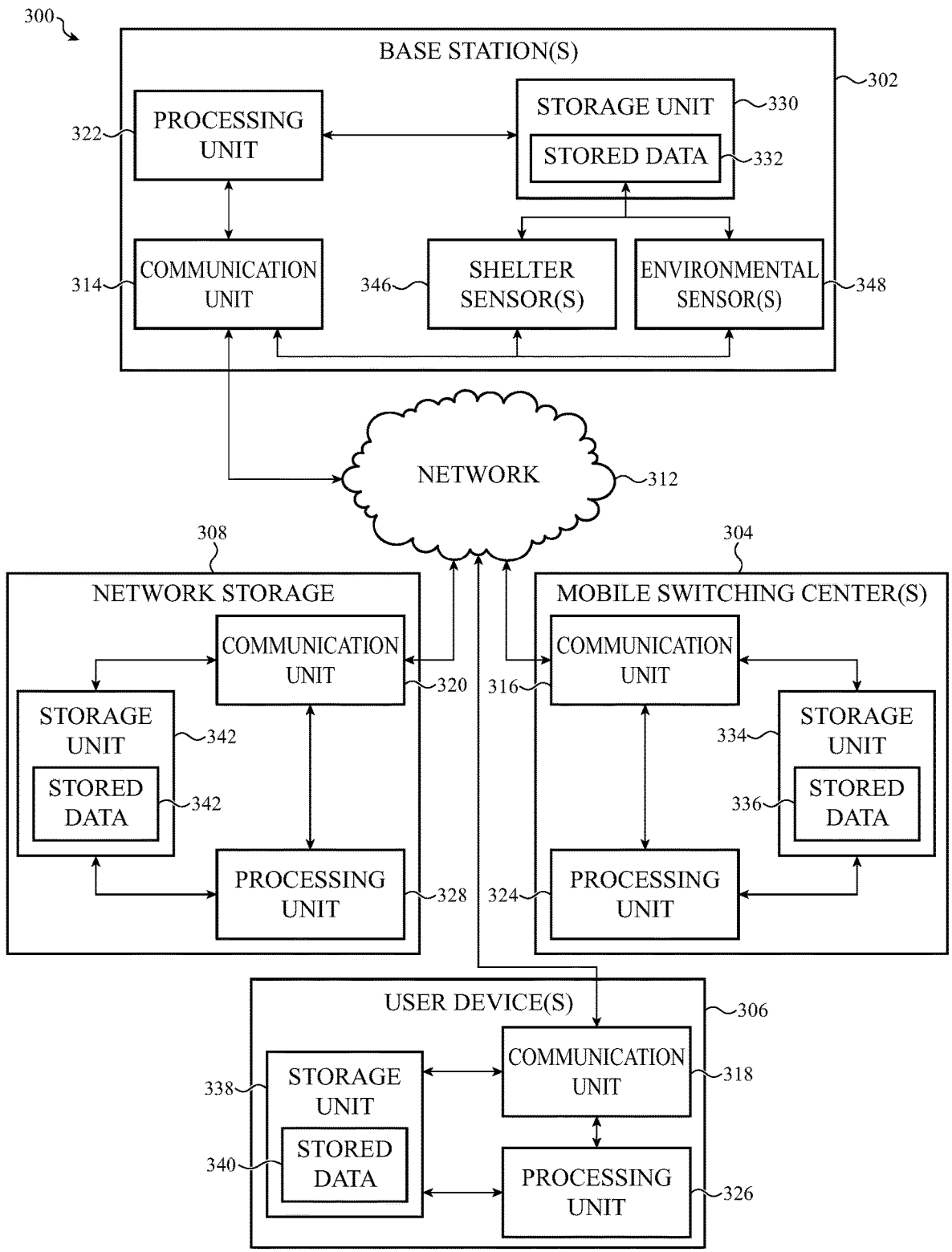
FIG. 3 depicts an example block diagram of components of a cellular network, as described herein.

FIG. 3 depicts a cellular network 300 according to one embodiment of the present disclosure. As should be appreciated, many kinds of cellular networks are possible and the depicted cellular network 300 is merely one non-limiting example.

The cellular network 300 includes one or more base station(s) 302, one or more mobile switching center(s) 304, one or more user device(s) 306, and a network storage 308. As described above with respect to FIGS. 1 and 2, the cellular network 300 may include base station(s) 302. The base station(s) 302 may include radio circuitry, antennae, and supporting structures. In addition, the base station(s) 302 may include shelter sensor(s) 346 and environmental sensor(s) 348, as discussed herein. The shelter sensor(s) 346 and the environmental sensor(s) 348 may be communicatively coupled to a storage unit 330 where information collected via the sensors may be stored as stored data 332. The stored data 332 may be stored permanently or temporarily, depending on specific data preferences. The storage unit 330 may be communicatively coupled with a processing unit 322 and a communication unit 314. The processing unit 322 and the communication unit 314 may be communicatively coupled with the network 312.

Mobile switching center(s) 304 may be connected to the base station(s) 302 via the network 312 by wireless or wired mechanisms. At the mobile switching center(s) 304, calls, text messages, and other signals may route through the mobile switching center(s) 304 via the base station(s) 302. The mobile switching center(s) 304 may further handle handover events that switch between base stations that handle user device functions as a user of the user device moves between regions associated with different base stations. As user devices move, the mobile switching center(s) 304 may ensure that a call is not dropped by switching the base station receiving signals when the original base station is no longer in range.

Mobile switching center(s) 304 may include a storage unit 334 holding stored data 336. The stored data 336 may include statistical information and/or instructions for switching base station(s) 302 depending on conditions sensed by the shelter sensor(s) 346 and/or the environmental sensor(s) 348. Associated electronics in the mobile switching center(s) 304 may include a processing unit 324 and a communication unit 316.

As discussed herein, user device(s) 306 may additionally be connected to the network 312. The user device(s) 306 may be electronic devices and may include mobile phones, smart phones, electronic watches, tablet computers, laptop computers, desktop computers, and any system that may be connected to the cellular network 300. The user device(s) 306 may include a variety of electronic components and may generally include a communication unit 318, a processing unit 326, and a storage unit 338 with stored data 340. The user device(s) 306 may be capable of making a cellular phone call via the network 312 and may be capable of accessing other network systems. In some embodiments, the information collected by the shelter sensor(s) 346 and the environmental sensor(s) 348 may be transmitted to the user device(s) 306 and may be stored as stored data 340 in the storage unit 338.

The cellular network 300 may additionally include network storage 308. The network storage 308 may include computer components such as a communication unit 320, a processing unit 328, and a storage unit 342 with stored data 344. The network storage may be a network-attached storage (NAS) unit that stores files and transmits the files to other connected devices. The NAS storage may include one or more hard drives, RAID systems, and any other computer storage device. The network storage 308 may store information transmitted over the network 312 (e.g., call data and text data) for a limited or undetermined amount of time. The network storage 308 may be configured to store instructions and logic on network administration depending on information received from the shelter sensor(s) 346 and/or the environmental sensor(s) 348.

Figure 4A:
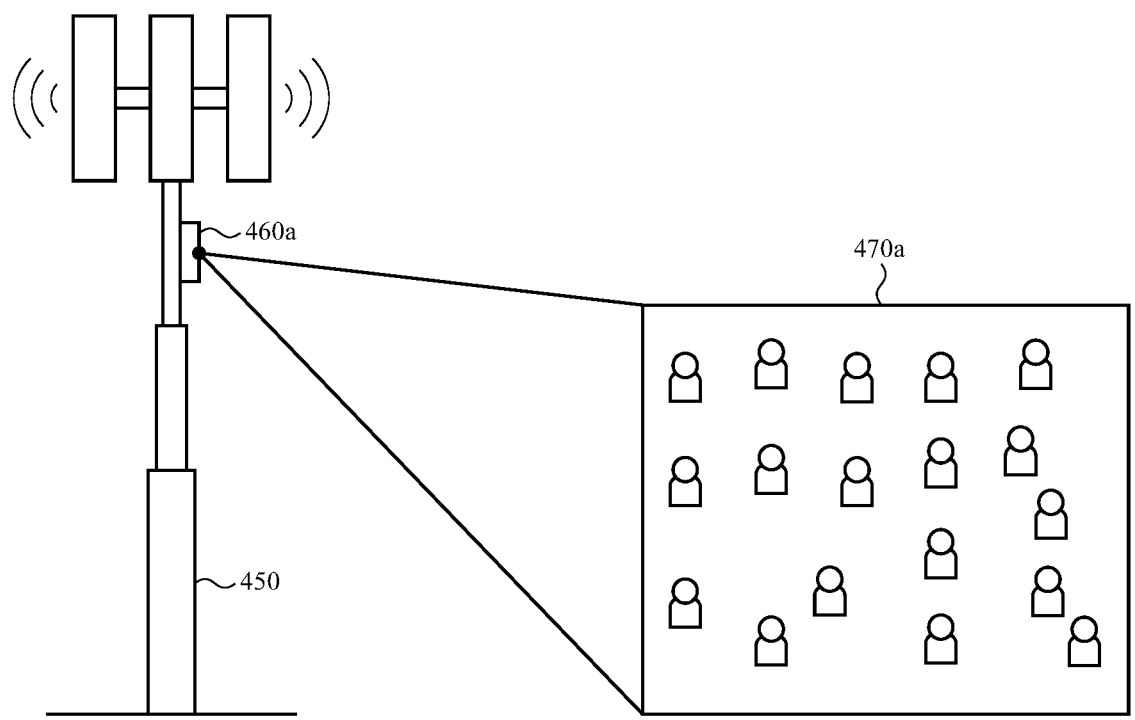
FIGS. 4A-4C illustrate an example base station collecting information of a number of environmental conditions from a cell coverage area of the base station, as described herein.
Figure 4B:
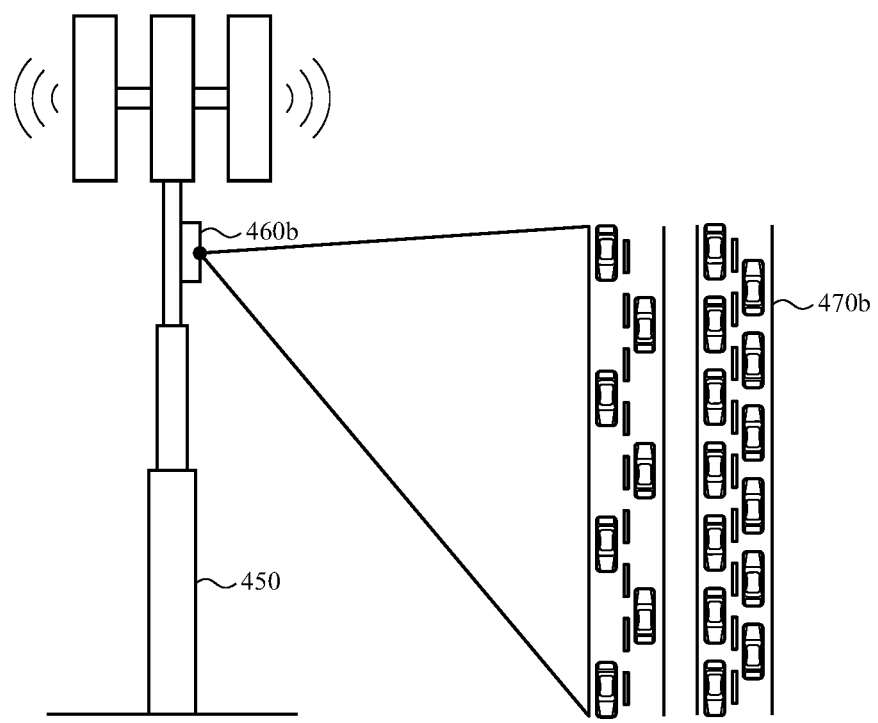
Figure 4C:
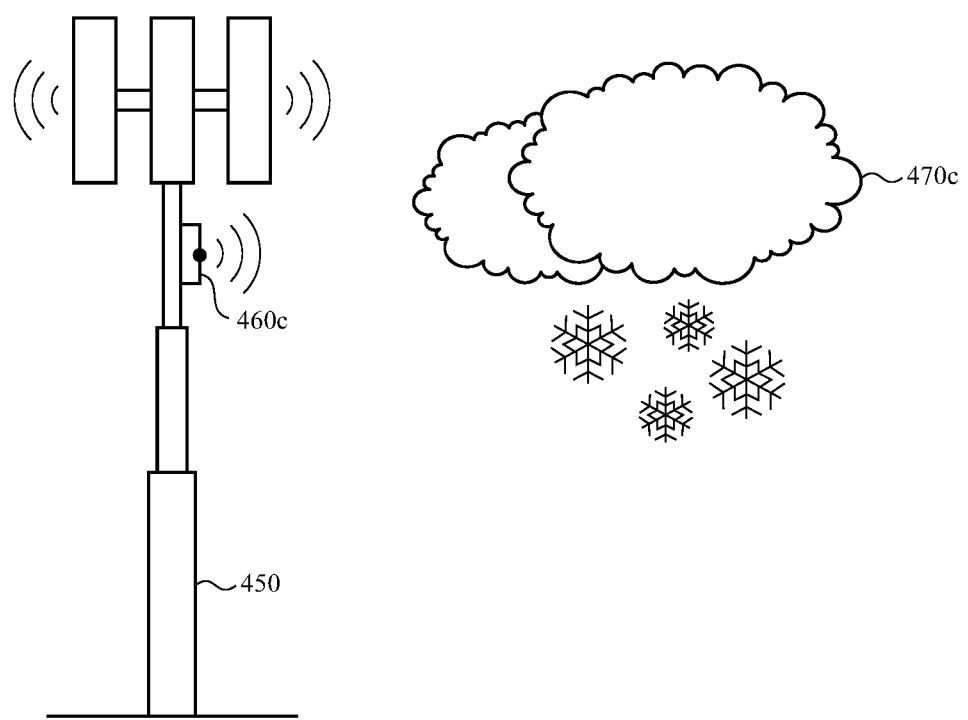

FIGS. 4A-4C illustrate example embodiments of environmental sensors 460a-460c capturing information of conditions within a cell coverage area of a cellular base station 450. In FIGS. 4A-4C, the cellular base station 450 may be a typical base station including radio transmitting equipment, antennas, and a support structure (e.g., as shown in FIG. 1). The cellular base station 450 illustrated in FIGS. 4A-4C are merely explanatory and any cellular base station may be used in accordance with the present disclosure. For example, a cellular base station may be mounted on an existing structure, such as a building, or a cellular base station may have a specialized structure, such as a metallic frame.

In FIG. 4A, the cellular base station 450 is provided with a camera or optical sensor 460a. In some embodiments, the camera or optical sensor 460a may detect visible light and in alternate or additional embodiments the camera or optical sensor 460a may detect infrared or ultraviolet light. The camera or optical sensor 460a may be configured to capture still images or may be configured to capture video information (e.g., a collection of still images captured consecutively).

The camera or optical sensor 460a may be configured to capture image information from a region 470a surrounding the base station. The region 470a may include a number of people, and images of these people may be captured by the camera or optical sensor 460a. The image information may be analyzed by associated systems (e.g., a processing unit) to undergo an image recognition analysis to determine the number of people present on the collected image. For example, systems may perform computer vision operations to gain a high-level understanding from digital images. In some embodiments, algorithms used by artificial intelligence systems may perform object recognition, object identification, and object detection processes. Such algorithms may include convolutional neural networks.

The image information of the region 470a may include the entire region serviced by the cellular base station, e.g., the cell coverage area, or may be a subset of a larger region serviced by the cellular base station. In the event that the region 470a is a subset of a larger region, the people captured in an image may be used as part of a formula or algorithm that estimates the number of people in the larger region. For example, the camera or optical sensor 460a may capture image information in a two-hundred square foot sub-region within a one-mile square foot area where the base station 450 provided cellular signals. Based on mapping data, the two-hundred square foot sub-region may be determined to correspond to a shopping center accounting for approximately 25% of the population of the one-mile square foot area. the number of people captured by the camera 460a may be multiplied by a predetermined value (e.g., four) and the number of people in the greater area may be estimated. The above values are used only for explanatory purposes and any value may be used in accordance with the disclosure presented herein.

In some embodiments, the camera or optical sensor 460a may be communicatively coupled with calendar and/or event database information to better determine a human population density and potential network load during a certain time period. For example, a calendar may detect that a current date is a holiday (e.g., Independence Day) and may change an estimated population density based on the holiday. In some embodiments, an event calendar may indicate that a popular concert is occurring or will occur in the future. A population density may be predicted or estimated based on capacity and/or predicted attendance of the popular concert.

FIG. 4B illustrates the base station 450 with a traffic sensor 460b. The traffic sensor 460b may be a camera (e.g., a HD camera), SONAR, an ultrasonic proximity detector, RADAR, and/or any other sensor that may detect vehicle traffic. The traffic sensor 460b may comprise multiple sensors, with each sensor configured to monitor a specific lane of traffic. For example, the base station 450 may be positioned proximate to a four-lane highway. The traffic sensor 460b may comprise four ultrasonic sensors, each ultrasonic sensor directed to a lane of traffic. In this way, each lane of the four-lane highway may be monitored by the traffic sensor 460b. In alternate or additional embodiments, the traffic sensor 460b may include one sensor for each direction of traffic (e.g., two sensors) regardless of the number of lanes.

In some embodiments, the traffic sensor 460b may detect current traffic conditions 470b and may transmit the information corresponding to the traffic conditions 470b to an external or internal storage device. The traffic conditions 470b may be collected over a period of time and may be used to predict future traffic conditions (e.g., traffic conditions during particular times of day and during particular days of the year). In some embodiments, the collected and predicted traffic conditions may be transmitted over the cellular network and may be provided automatically to user of the cellular network. In some embodiments, the collected and predicted traffic conditions may be provided as part of a subscription plan.

The traffic sensor 460b may additionally or alternatively be used to detect vehicle presence in a parking lot (e.g., to estimate a crown at a business); to monitor fleet information (e.g., to determine if a fleet truck is on time); to monitor vehicle speed; and the like. In some embodiments, the traffic sensor 460b may be used in combination with other traffic detection systems and may be used to supplement or augment existing traffic data systems.

FIG. 4C illustrates the base station 450 with weather sensors 460c. The weather sensors 460c may include any sensor configured to monitor weather conditions 470c. In FIG. 4C, the weather condition 470c is a snowing weather event. The weather sensors 460c may include cameras, barometric pressure sensors, a thermometer, and the like to determine the current weather condition 470c. In some embodiments, the weather sensors 460c may be communicatively coupled with a larger weather forecast network (e.g., additional weather sensors affixed to additional base stations) and may be used to track weather conditions as they move throughout the atmosphere.

In some embodiments, the weather conditions 470c may be transmitted over the cellular network and may be provided automatically to user of the cellular network. If the weather conditions 470c are sufficiently dangerous (e.g., a tornado or a snowstorm), a warning may be sent over the cellular network, warning users of a current or future dangerous weather condition. In some embodiments, the collected and predicted weather conditions may be provided as part of a subscription plan.

Figure 5:
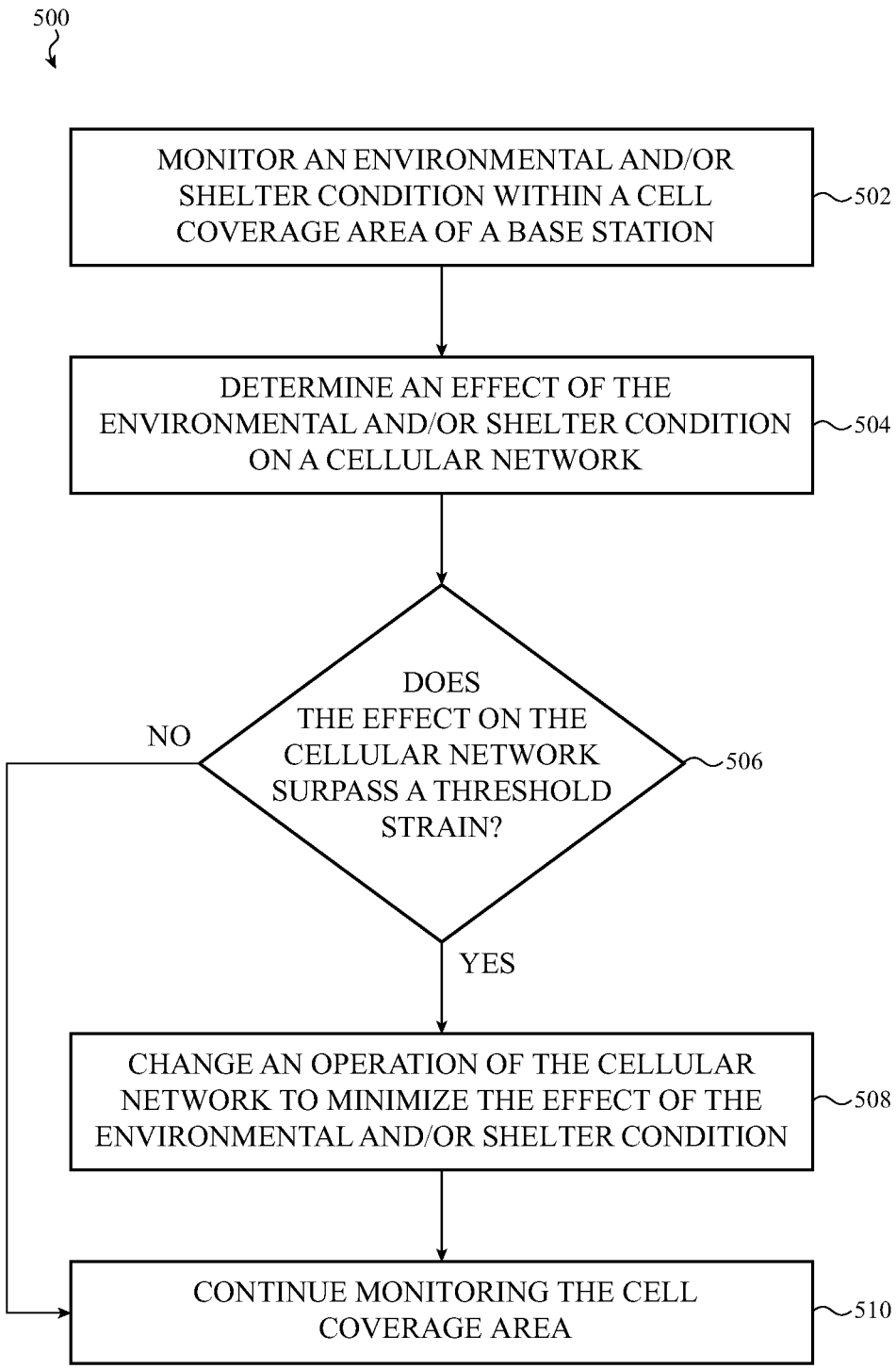
FIG. 5 depicts a flowchart of a network enhancement in response to collected information, as described herein.

FIG. 5 depicts an example system 500 of a network enhancement for a cellular network in response to collected information. At operation 502, sensors on or near a base station may monitor an environmental and/or shelter condition within a cell coverage area. The sensors may be any type of sensor discussed herein (e.g., a weather sensor) or may be any other sensor, or collection of sensors, configured to monitor environmental or shelter conditions. In a non-limiting example, a population density sensor (e.g., a camera) may be configured to collect image data of the region surrounding the base station. The image data may include a number of photographic representations of people surrounding the base station. In another non-limiting example, a future snowstorm may be predicted by, for example, barometric pressure sensors.

At operation 504, components of the system 500 (e.g., processing units) may determine an effect of the environmental and/or shelter condition on the cellular network. In a non-limiting example, in a situation where the population density sensor detects a number of people, the components of the system 500 may first determine how many people are detected by the population density sensor (e.g., by image analysis) and may then determine the effect that the detected people will have on a network load. For example, if five hundred people are detected, components of the system 500 may determine that one hundred and fifty simultaneous calls may be expected.

In another non-limiting example, a future snowstorm may be determined to have a 50% increase in cellular network call traffic (since, for example, people are more likely to be indoors).

At operation 506, components of the system 500 determine whether the effect of the sensed condition on the cellular network surpasses a threshold network strain. Here, the determination may prevent the portion of the cellular network running through the base station from becoming overloaded from, for example, a large number of cellular phone calls. In a non-limiting example, a base station may have one hundred voice channels and may include circuitry and hardware sufficient to send and receive radio signals for one hundred simultaneous calls (corresponding to a threshold network strain). If, at operation 504, it is determined that one hundred and fifty simultaneous calls are expected at a future point, then the threshold network strain may be considered to be surpassed and the system 500 may continue to operation 508. If only fifty simultaneous calls are expected, then the system 500 may continue to operation 510, where no change is made to cellular network routing and sensors continue monitoring the cell coverage area. The threshold strain may be any ratio between expected calls and channel availability, including ratios greater than, equal to, or less than 1.

At operation 508, it may have been determined that a threshold network strain is or will be surpassed. In the non-limiting example discussed above, it may be determined that one hundred and fifty calls are expected and that the base station only has the capacity for one hundred calls. In this instance, components of the system 500 may change an operation of the cellular network to minimize the effect of the environmental and/or shelter condition. For example, components of the base station may borrow voice channels from surrounding base stations (e.g., calls that would ordinarily be routed though the nearest base station may instead by routed through another nearby base station via a mobile switching center). In some embodiments, users of the cellular network may be alerted of the heavy load and may be asked to delay making calls or to move to another location serviced by another base station.

Figure 6:
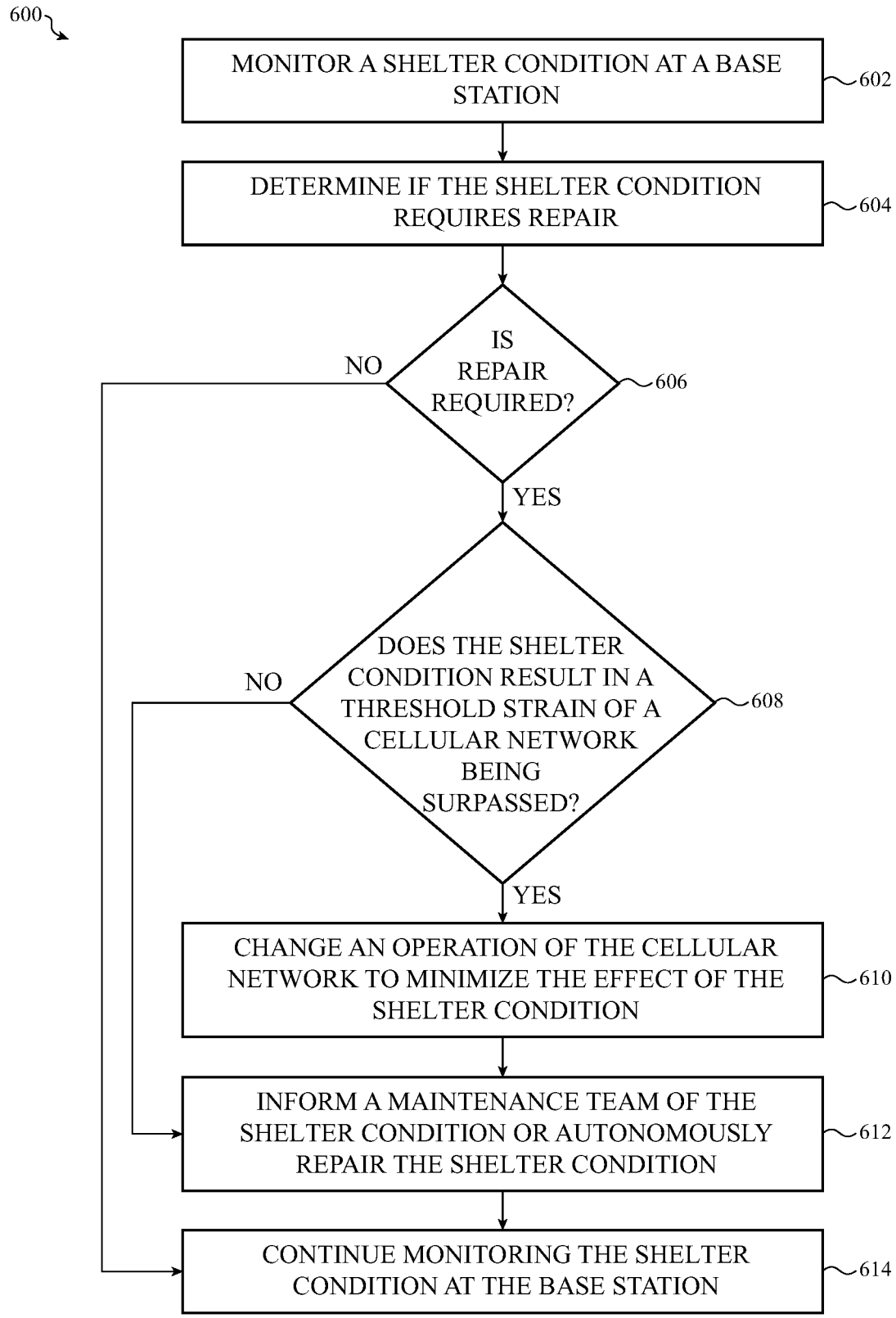
FIG. 6 depicts a flowchart of a network maintenance in response to collected information, as described herein.

FIG. 6 depicts an example system 600 of a maintenance operation for base stations and components for a cellular network in response to collected information. At operation 602, sensors on or near a base station may monitor a shelter condition at a base station. The sensors may be any type of sensor discussed herein (e.g., an equipment sensor or a temperature sensor) or may be any other sensor, or collection of sensors, configured to monitor shelter conditions. In a non-limiting example, sensors may detect the presence of ice on a structure of the base station. In alternate or additional example, sensors may detect a temperature of cellular network components.

At operation 604, components of the system 600 (e.g., processing units) may determine whether the detected shelter condition requires maintenance or repair. In a non-limiting example, when ice is detected on a portion of the base station, it may be determined that the weight of the ice may damage or collapse the base station. In an alternate or additional example, a temperature reading of cellular network components may be higher than a normal operating temperature (e.g., the components are overheating).

At operation 606, the determination discussed with respect to operation 604 is made. Here, it may be determined whether the shelter condition will resolve itself without any outside interaction (e.g., if ice will melt before becoming sufficiently heavy or if a component may return to a normal operating condition) or whether outside intervention is necessary (e.g., whether a maintenance crew need to come on-site to resolve the issue). This may be determined in a number of ways. In some embodiments, a time period where the shelter condition exists may be measured. If the time period reaches a predetermined threshold time, then it may be determined that repair is required. In some embodiments, it may be determined whether the shelter condition exceeds a threshold value. If repair is determined to not be required, then the sensors may resume monitoring the shelter condition at the base station at operation 614. In some embodiments, the system 600 may be a recursive system and may return to operation 602.

At operation 608, components of the system 600 determine whether the effect of the sensed shelter condition on the cellular network surpasses a threshold network strain. Here, the determination may prevent the portion of the cellular network running through the base station from becoming overloaded from, for example, maintenance malfunctions. In a non-limiting example, a large icicle present on an outer portion of a base station may have the potential to damage radio transmitters or receivers. If, at operation 608, it is determined that the icicle possesses a sufficient present or future danger to base station components related to the cellular network, then the threshold network strain may be considered to be surpassed and the system 600 may continue to operation 510. If the icicle is determined unlikely to hinder cellular network operations, then a maintenance team may be alerted at operation 612 without changing any network operation. In some instances, a shelter condition may be automatically repaired (e.g., an electrical component may be turned off temporarily to prevent overheating).

At operation 610, it is determined that an operation of the cellular network is in danger of becoming overloaded or may otherwise be detrimentally affected. Here, it may have been determined that a threshold network strain is or will be surpassed. In the non-limiting example discussed above, it may be determined than an icicle will affect incoming and outgoing cellular network traffic. In this instance, components of the system 600 may change an operation of the cellular network to minimize the effect of the shelter condition. For example, components of the base station may borrow voice channels from surrounding base stations (e.g., calls that would ordinarily be routed though the nearest base station may instead by routed through another nearby base station via a mobile switching center). In some embodiments, users of the cellular network may be alerted of the reduced load capabilities and may be asked to delay making calls or to move to another location serviced by another base station.

Following operation 610, a maintenance team may be alerted of the shelter condition or the shelter condition may be automatically repaired at operation 612, as discussed above. Following the alert of the shelter condition, sensors may continuing monitoring the shelter condition at operation 614. As discussed herein, the system 600 may be a recursive system and may return to operation 602 following operation 614.

Figure 7:
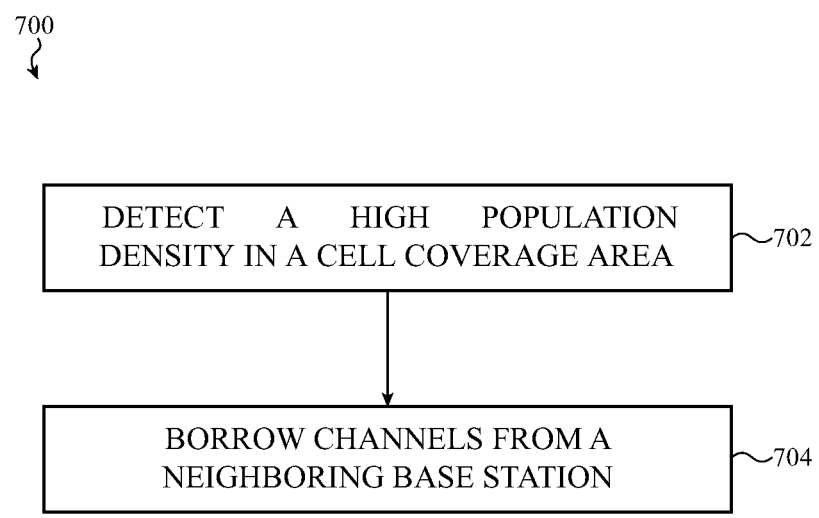
FIG. 7 depicts an example flowchart of routing network signals in response to collected information concerning an environmental condition relating to a high population density within a cell coverage area of a base station, as described herein.

FIG. 7 depicts an example process 700 of routing network signals in response to a detection of a high population density. At operation 702, a high population density within a cell coverage area of a base station may be detected. In some embodiments, the high population density may be detected by sensors (e.g., a camera), as discussed herein. In alternate or additional embodiments, the high population density may be determined by measuring a network load and calculating the expected population density via the network load.

At operation 704, a channel switching operation may be performed. For example, a mobile switching center may direct a mobile device to tune to a different radio frequency assigned to a nearby channel. In some embodiments, this process may be similar to a handoff, where calls are transitioned between different voice channels as a mobile device moves between cell coverage areas.

Figure 8:
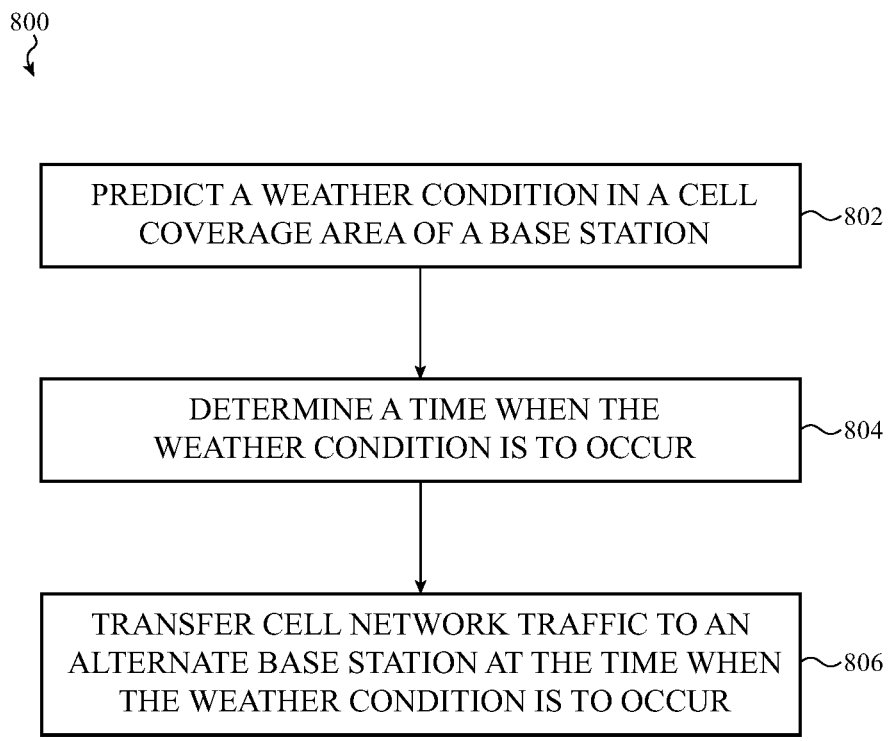
FIG. 8 depicts an example flowchart of routing network signals in response to collected information related to an environmental condition relating to a weather event within cell coverage area of a base station, as described herein.

FIG. 8 depicts an example process 800 of routing network signals in response to weather conditions. At operation 802, a future weather condition to occur within a cell coverage area of a base station may be predicted. The weather condition may be predicted by sensors (e.g., weather sensors) or by information on a public or private network (e.g., the Internet). The weather condition may be any weather event with the potential to harm life or property including, but not limited to, snowstorms, rainstorms, hailstorms, tornados, earthquakes, and the like.

At operation 804, a time when the weather condition is to occur may be determined or predicted. This prediction may occur as a result of sensed weather conditions surrounding the base station (e.g., a barometric pressure indicative of a future rainstorm). In some embodiments, multiple base stations may be linked by a network and weather conditions may be sensed along a string of base stations to determine, for example, a speed and a direction of the weather condition. In a some embodiments, users of electronic devices connected to a cellular network may be informed of a current or future weather condition occurring in their area (as determined by a connected base station).

At operation 806, cellular network may be scheduled to be transferred, via, for example, a channel switching operation, at a time when the weather condition is to occur. For example, a mobile switching center may be informed that a base station will be entirely or partially inactive at a certain time and data (e.g., the time and date when a rainstorm is to occur). When the weather condition is to occur, a mobile device may be directed to tune to a different radio frequency assigned to a nearby channel. In some embodiments, this process may be similar to a handoff, where calls are transitioned between different voice channels as a mobile device moves between base station regions.

Figure 9:
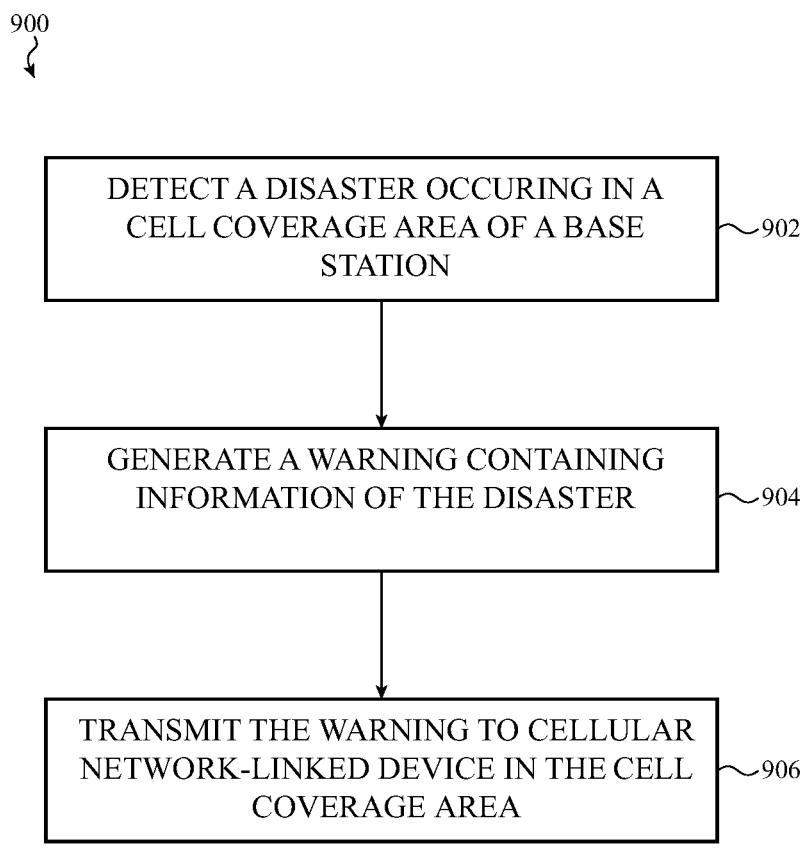
FIG. 9 depicts an example flowchart of generating and transmitting alerts concerning a natural disaster and/or a manmade disaster, as described herein.

FIG. 9 depicts an example system 900 of generating and transmitting alerts concerning a natural disaster and/or manmade disaster. At operation 902, a natural disaster and/or manmade disaster within a cell coverage area may be detected by, for example, sensors. As described herein, a natural disaster and/or manmade disaster may include, for example, an earthquake, a tsunami, a gunshot, an explosion, and the like and may be detected by one or a series of sensors configured to collect audio information (e.g., a microphone), vibrational information (e.g., a seismograph), visual information (e.g., a camera) and the like.

At operation 904, a warning containing information of the natural disaster and/or manmade disaster may be generated. In some embodiments, the warning may be a text warning describing a type of natural disaster and/or manmade disaster (e.g., gunshot), a location of the event (e.g., the corner of Main St. and First St.), and a time that the event occurred (e.g., 12:05 AM). In some embodiments, the warning may include video information or image information of the disaster at captured by cameras on a base station.

At operation 906, the warning may be transmitted to electronic devices connected to the portion of the cellular network that is transmitted and received by the base station. In this way, a directed warning may be issued to only those people that may be impacted by the natural disaster and/or manmade disaster. In some embodiments, a natural disaster and/or manmade disaster may possibly affect a wide-area including numerous base stations. In such situations, electronic devices connected to any of the affected base stations may receive the warning generated at operation 904.

Figure 10:
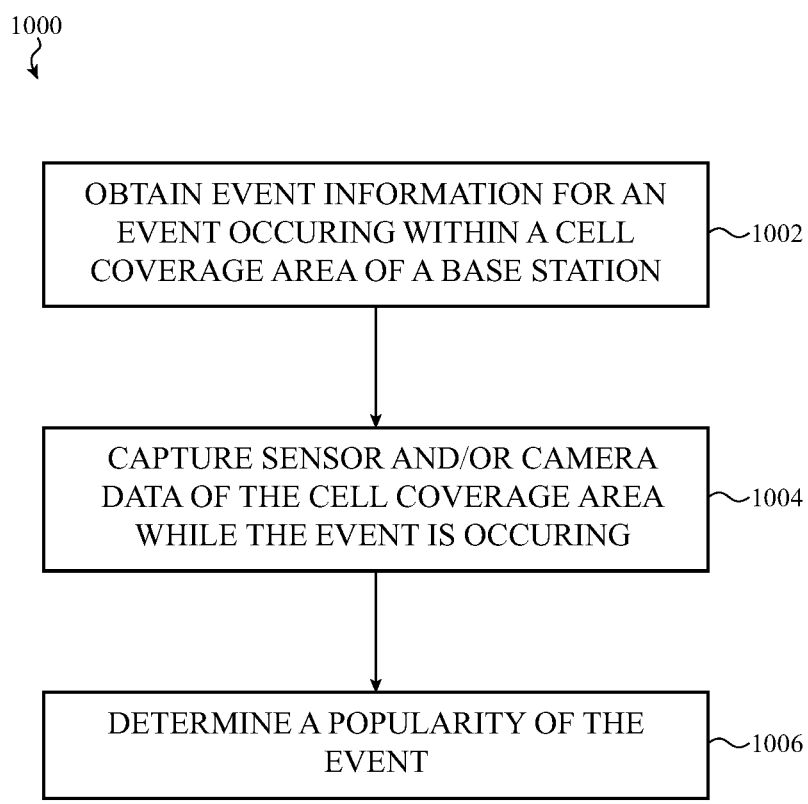
FIG. 10 depicts an example flowchart of collecting information related to an event from one or more sensors on a base station and determining a popularity of the event based on the collected event information, as described herein.

FIG. 10 depicts an example system 1000 of obtaining event popularity information for an event occurring within a cell coverage area of base station. At operation 1002, event information may be obtained for an event occurring at a location within a cell coverage area of a base station. As discussed herein, an event may be a sporting event or a concert and information concerning the event may be available on calendar applications and/or data networks (e.g., the Internet or an internal network). In some embodiments, sensors may determine that an event is occurring by, for example, image information detecting a high volume of people and/or traffic.

At operation 1004, sensor and/or camera information of the location where the event is occurring may be captured. In some embodiments, image information may be analyzed and an estimated number of people attending the event may be determined.

At operation 1006, a popularity of the event may be determined by analyzing the information captured at operation 1004. In some embodiments, once the popularity of the event is determined, a cellular network load may be predicted and network enhancements (e.g., sending a message to users of the cellular network or load switching) may be performed.

As described above, one aspect of the present technology is the collection and use of information concerning various conditions to provide, for example, biometric capture (e.g., facial recognition). The present disclosure contemplates that, in some instances, this gathered data may include personal information data that uniquely identifies, may be used to identify and/or authenticate, or can be used to contact or locate a specific person. Such personal information data can include facial information, demographic data, location-based data, telephone numbers, electronic mail addresses, home addresses, date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A method of providing a cellular network enhancement, the method comprising:
   collecting information from one or more sensors associated with a base station, the one or more sensors including one or more weather sensors, the collected information pertaining to a cell coverage area of the base station;
   using the collected information to predict an environmental condition;
   predicting that the environmental condition will damage the base station;
   sending, to a maintenance service, an alert containing information about the predicted environmental condition and the predicted damage to the base station; and
   in response to predicting that the environmental condition will damage the base station, routing signals of the cellular network to an alternate base station.

2. The method of claim 1, wherein:
   the one or more sensors include a collection of weather sensors;
   the collected information includes at least one of a pressure value, a temperature value, a humidity value, or a wind speed value; and
   the environmental condition is a future weather condition comprising at least one of frost, snow, lightning, rain, or hail.

3. The method of claim 2, further comprising sending an alert containing information about the future weather condition to electronic devices within the cell coverage area of the base station.

4. The method of claim 2, wherein the alert contains information about the future weather condition.

5. The method of claim 1, wherein:
   a cellular network that transmits and receives through the base station comprises an overloaded portion; and
   a mobile switching center transfers signals of the overloaded portion from the base station to the alternate base station.

6. The method of claim 1, wherein:
   the base station is part of a grid that comprises a set of base stations connected to a cellular network;
   each base station of the set of base stations comprises a set of sensors; and
   a mobile switching center is configured to route the signals of the cellular network between base stations of the set of base stations based on readings from the set of sensors.

7. The method of claim 1, wherein the environmental condition is at least one of a current weather condition, a future weather condition, a natural disaster, an automobile density, a human population density, or a manmade disaster.

8. A method for providing a cellular network enhancement, the method comprising:
   collecting information from a sensor within a cell coverage area of a base station, the base station transmitting signals of a cellular network;
   using the collected information to predict that a weather condition will occur within the cell coverage area at a future time, and to predict that the weather condition will cause damage to the base station at the future time;
   transmitting to a maintenance service, before the future time, an alert containing information about the predicted weather condition and the predicted damage to the base station; and
   transferring the signals of the cellular network to an alternate base station, at or before the future time.

9. The method of claim 8, further comprising:
   transmitting an alert containing information about the weather condition to electronic devices present within the cell coverage area.

10. The method of claim 8, wherein the signals of the cellular network are transferred to an alternate base station by a mobile switching center.

11. The method of claim 8, further comprising:
    the base station controlling a channel of the alternate base station at the future time.

12. A method of providing a cellular network enhancement, comprising:
    acquiring an image using a camera associated with a base station;
    analyzing the image to determine a first number of electronic device users in the image;
    estimating, from the first number of electronic device users in the image, a second number of electronic device users not in the image and within a cell coverage area of the base station;
    estimating, based at least in part on the first number of electronic device users and the second number of electronic device users, a number of electronic devices that may require wireless communications through the base station;
    predicting, based at least in part on the number of electronic devices that may require wireless communications through the base station, a load that the number of electronic devices will place on a cellular network that provides the wireless communications through the base station;
    determining the predicted load will inflict a threshold strain on the cellular network; and
    in response to determining that the predicted load will inflict the threshold strain, routing signals of the cellular network to an alternate base station.

13. The method of claim 12, wherein:
    the base station is part of a grid that comprises a set of base stations connected to the cellular network; and
    a mobile switching center is configured to route the signals of the cellular network between base stations of the set of base stations in response to determining that the predicted load will inflict the threshold strain.

14. The method of claim 12, wherein the first number of electronic device users is determined based at least in part on a number of people in the image.

15. The method of claim 14, further comprising:
    determining a density of the number of people in the image; wherein,
    the second number of electronic device users is estimated based at least in part on the density of the number of people in the image.

16. The method of claim 12, wherein the first number of electronic device users is determined based at least in part on a number of vehicles in the image.

17. The method of claim 16, further comprising:
    determining a density of the number of automobiles in the image; wherein,
    the second number of electronic device users is estimated based at least in part on the density of the number of vehicles in the image.

18. The method of claim 12, wherein the camera is a visible light camera.

19. The method of claim 12, wherein the camera is an infrared camera.

\* \* \* \* \*